June 4, 1963 G. A. GIANNUZZI 3,092,295

TAPE FEED MECHANISM

Filed June 5, 1959 5 Sheets-Sheet 1

INVENTOR
GEORGE A. GIANNUZZI

BY Donald F. Voss
ATTORNEY

June 4, 1963 G. A. GIANNUZZI 3,092,295

TAPE FEED MECHANISM

Filed June 5, 1959 5 Sheets-Sheet 2

June 4, 1963 G. A. GIANNUZZI 3,092,295

TAPE FEED MECHANISM

Filed June 5, 1959 5 Sheets-Sheet 3

June 4, 1963 G. A. GIANNUZZI 3,092,295

TAPE FEED MECHANISM

Filed June 5, 1959 5 Sheets-Sheet 5

United States Patent Office 3,092,295

Patented June 4, 1963

3,092,295
TAPE FEED MECHANISM

George A. Giannuzzi, Vestal, N.Y., assignor to International Business Machines Corporation, New York, N.Y., a corporation of New York Filed June 5, 1959, Ser. No. 818,399
7 Claims. (Cl. 226—49)

Figure 1:
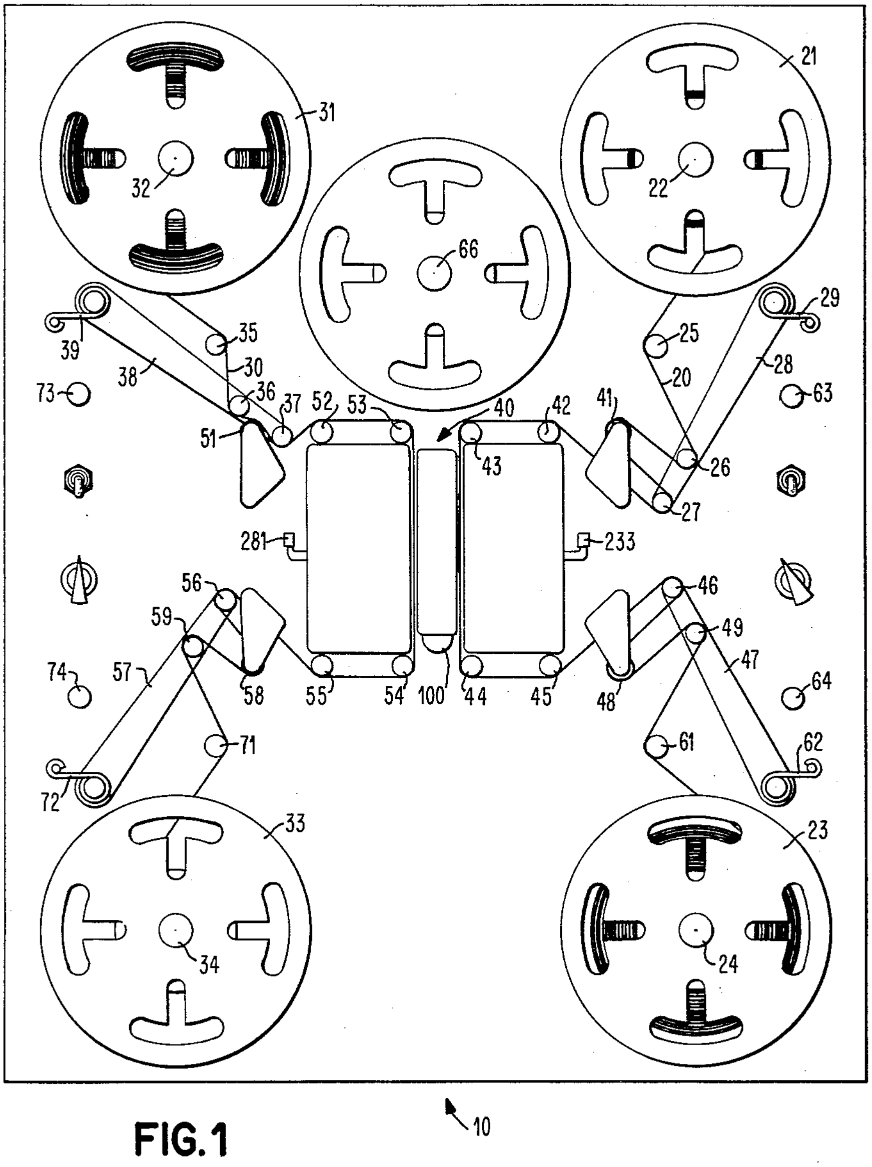

This invention relates to apparatus for feeding records in web or strip form relative to a record sensing device and, more particularly, to apparatus for enabling continuous operation of record sensing devices wherein the record being sensed is in web or strip form and being fed at relatively high speeds.

The present invention, while having broader application, permits the continuous sensing of perforations entered in coded form in paper tape, such as the type utilized in computer or telegraphic systems, at a reading speed of approximately 800 characters per second; including the ability to arrest the tape within one character space after detecting an end of record perforation or otherwise receiving a stop signal so that the very next perforation or character may be sensed upon the starting of the tape. In many instances, the tape contains several records which are separated only by a stop perforation. This arrangement requires the stopping of the tape after the reading of each record. It is desirable to stop the tape without sensing a perforation of an adjacent record. Otherwise, some type of storage apparatus is required to store the data of that record for subsequent processing; and, of course, this would involve rather expensive apparatus.

Continuous operation of mechanism for feeding the tapes containing the records relative to the sensing device is achieved without splicing the end of the tape being sensed to the end of a standby tape. The perforations in the tapes are sensed by optical apparatus which is arranged to sense the perforations entered in the tapes which are disposed in two different paths arranged symmetrically about the sensing device. Hence, a tape may be fed relative to the sensing device while a standby tape is positioned for feeding so that, when the sensing of one tape has been completed, the other tape will be ready to be sensed. In this manner, continuous operation may be accomplished.

The feeding and stopping of the tapes, as mentioned above, is achieved by magnetic means. The tapes are each threaded between a drive capstan, capable of being rotated in a clockwise or counterclockwise direction, and friction rollers mounted opposite each other in proximity to and in normally spaced relation with the drive capstan. The friction rollers are carried by the armatures of a common magnet. Upon energization of the magnet, the friction rollers press the tapes against the drive capstan to establish a driving connection between the capstan and the tapes. However, it is proposed to have one tape stand by while the other tape is being fed relative to the sensing device. Accordingly, to enable only one tape at a time to be fed relative to the sensing device by the apparatus just described, mechanism is provided to selectively move the armature carrying the friction roller associated with the standby tape out of the range of attraction of the magnet. This mechanism also has the facility for moving the armature into the attracting range of the magnet upon the completion of sensing the other record.

The mechanism for arresting the movement of the tapes within one character space includes an armature for clamping the associated tape against an anvil member. Similar to the arrangement for feeding the tapes, the armatures for clamping the tapes against the associated anvils are attracted by a common magnet. The mechanism mentioned above for selectively moving the armatures carrying the friction rollers out of the attracting range of the magnet is also utilized for selectively shifting the armatures for clamping the tapes against the anvils out of the attracting range of the associated magnet. When the magnet for attracting the armatures carrying the friction rollers is energized for starting the feeding of the tapes, the magnet for attracting the armatures for clamping the records against the anvils to arrest the tapes is de-energized; and vice versa when the functions are reversed.

The armatures are very close to the pole pieces of their associated magnets when in the operating range thereof. When sensing a tape approximately .004 inch thick, the armatures are spaced approximately .002 inch from the pole pieces of the magnets. The armatures for arresting movement of the tapes are biased to drag on the tapes; however, the armatures carrying the friction drive rollers are biased out of contact with the tapes. The arrangement just described permits continuous high-speed operation with an economy of elements.

In addition to the features already described, apparatus is provided to facilitate easy insertion of threading of the tapes into the feeding mechanism and thereby reduce the period of time consumed during this operation.

Apparatus is also provided to facilitate rewinding of a tape while another tape is being sensed.

Thus, it is a prime object of this invention to provide an improved arrangement of apparatus for feeding record elements in web form relative to a sensing device which enables continuous sensing of record elements at a relatively high speed.

Another object of the invention is to provide an improved arrangement of apparatus for feeding record elements in web form relative to a sensing device which enables continuous sensing of record elements at relatively high speeds with an economy of apparatus.

Still another object of the invention is to provide an arrangement of apparatus for feeding record elements in web form relative to a sensing device which permits the threading of a standby record element within its associated feeding apparatus while another record is being sensed.

Yet another object of the invention is to provide apparatus for feeding record elements in web form relative to a sensing device which enables rewinding one record element while another record element is being sensed.

A further object of the invention is to provide apparatus for selectively feeding record elements disposed in different paths relative to a common sensing means which utilizes a common actuating means for bringing the record feeding and arresting apparatus for any of the record elements into an operative position and which includes apparatus associated with each of the record feeding and arresting apparatus to selectively bring the same into operating range of the common actuating means.

Other objects of the invention will be pointed out in the following description and claims and illustrated in the accompanying drawings, which disclose, by way of examples, the principle of the invention and the best mode, which has been contemplated, of applying that principle.

Figure 2:
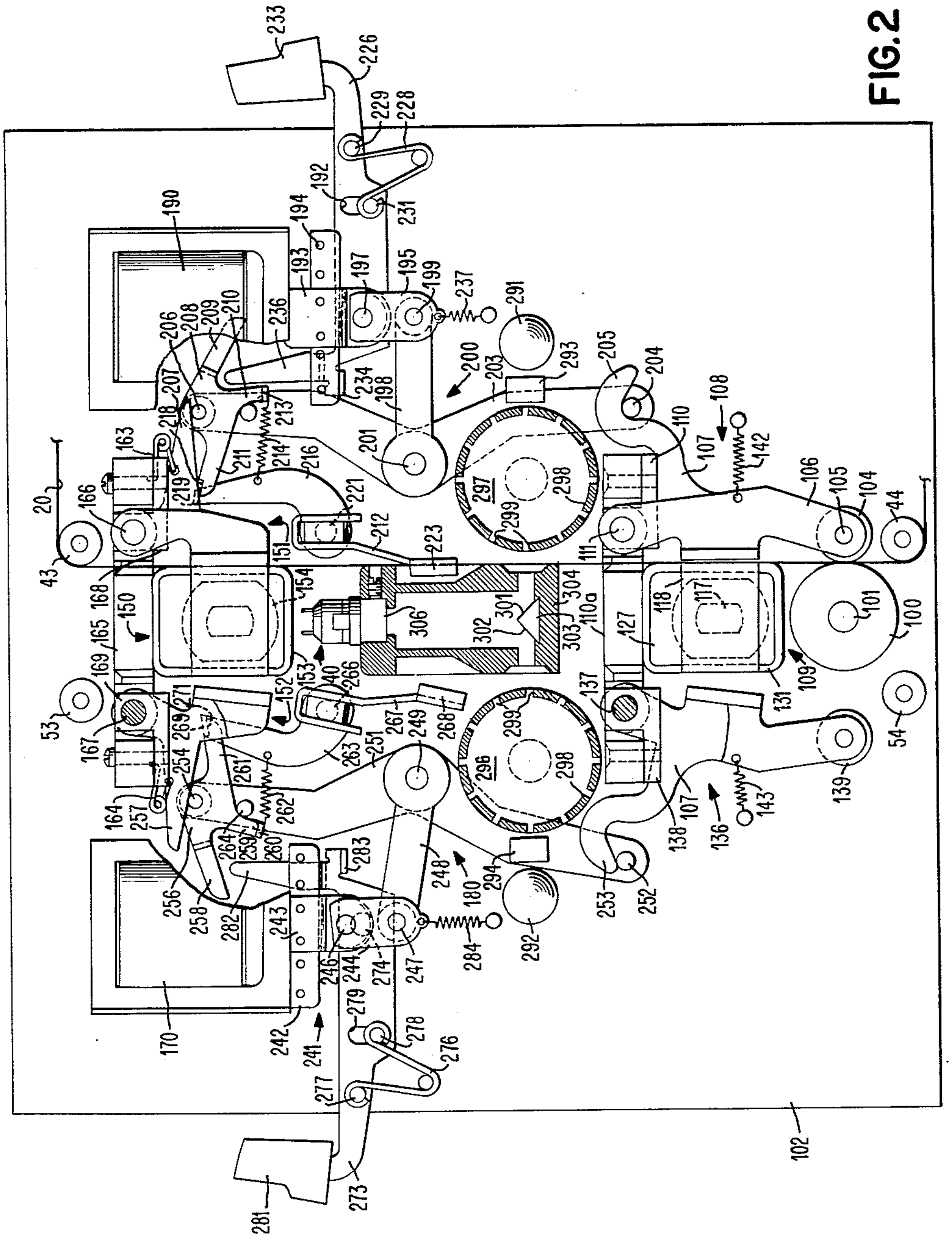
Figure 3:
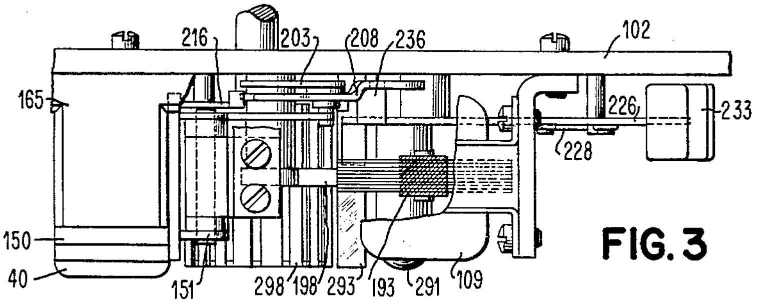
Figure 5:
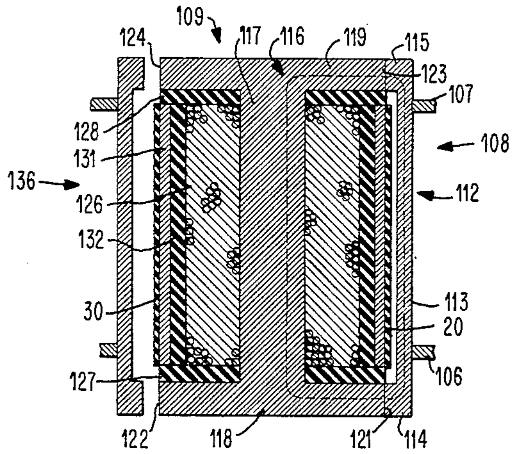
Figure 4:
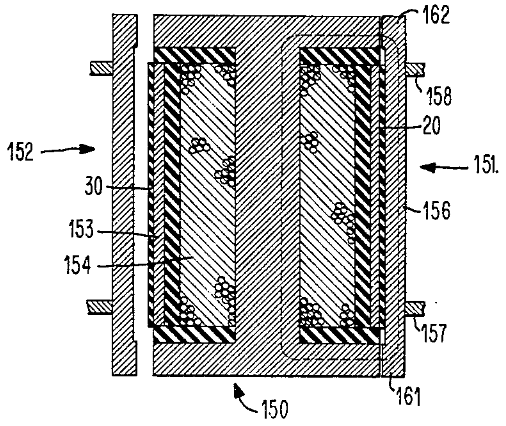
Figure 7:
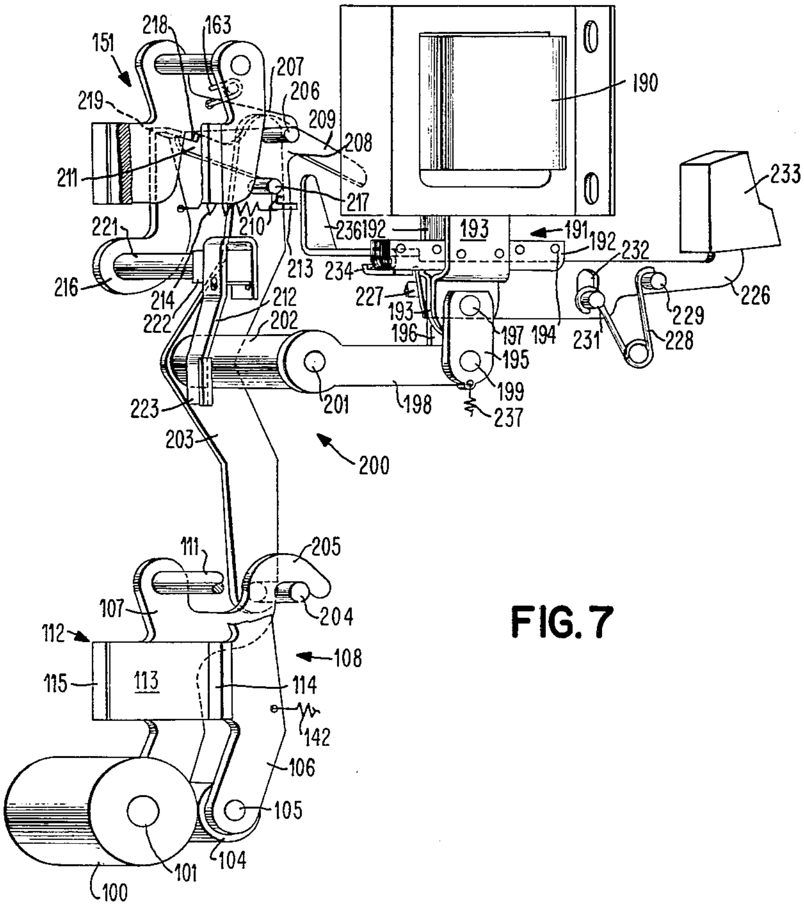
Figure 6:
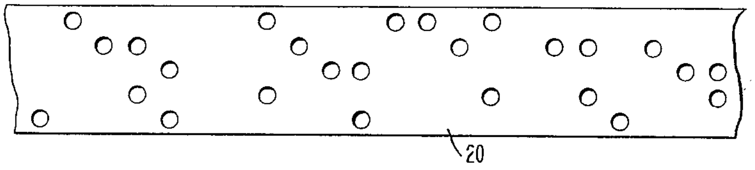
Figure 8:
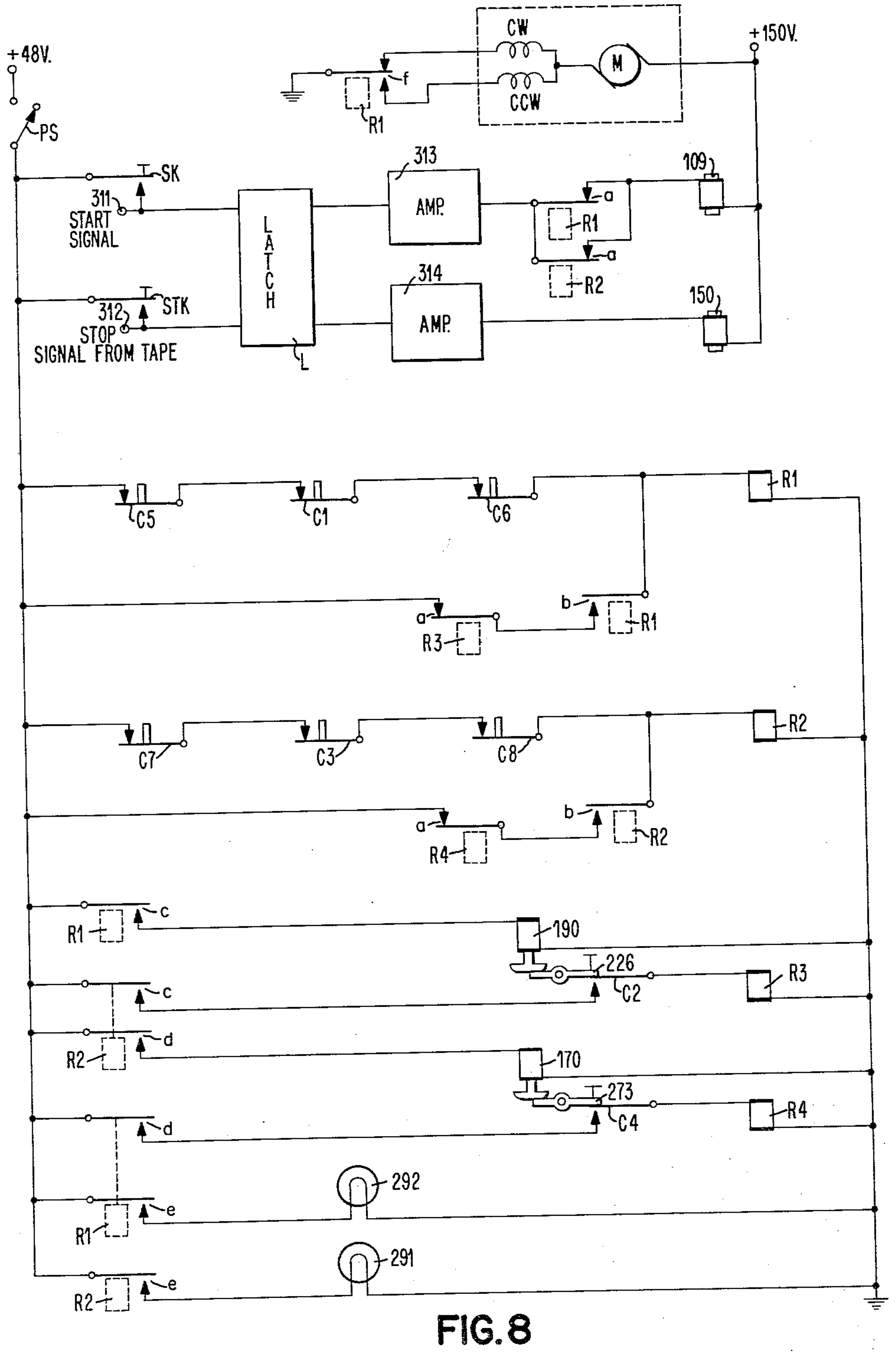

In the drawings:

FIG. 1 is a front elevational view schematically illustrating the tape reader,

FIG. 2 is a front elevational view of the mechanism for enabling the tapes to be selectively driven relative to the sensing mechanism, FIG. 3 is a plan view of the right half of the mechanism shown in FIG. 2, FIG. 4 is a partial sectional view of the magnet and armatures associated therewith for arresting the tapes relative to the sensing mechanism, FIG. 5 is a partial sectional view of the magnet and armatures associated therewith for facilitating the driving of the tapes relative to the sensing mechanism, FIG. 6 is a detail view of the perforated tape, FIG. 7 is a perspective view of the right half of the mechanism shown in FIG. 2, and FIG. 8 is a diagram of the circuitry for controlling the tape feed and sensing mechanisms.

With reference to the drawings and, particularly, to FIG. 1, the invention is shown by way of an example as a machine 10 for processing perforated record tapes 20 and 30 fed in different paths relative to a common sensing means 40. As shown, the tape 20 is being sensed while the tape 30 is ready to be sensed upon completion of the sensing of tape 20.

Each of the tapes 20 and 30 is perforated in coded form to represent data, as in FIG. 6.

Referring again to FIG. 1, the tapes 20 and 30 are contained upon reels or spools 21 and 31 which are positioned to be rotated about centers 22 and 32, respectively. As the tapes 20 and 30 are fed relative to the sensing means 40, they may be taken up or wound upon reels 23 and 33 which are mounted to rotate about centers 24 and 34, respectively.

The tapes 20 and 30 unwind from the reels 21 and 31 and pass over idler rolls 25 and 35 and spaced rolls 26, 27 and 36, 37 carried by tension arms 28 and 38, respectively. The tension arms 28 and 38 are biased by springs 29 and 39, so as to urge by means of the rolls 26, 27 and 36, 37 the tapes 20 and 30 to pass around idler rolls 41 and 51 as they continue around rolls 27 and 37. The tapes 20 and 30 pass from around the rolls 27 and 37 to the front of spaced in line rolls 42, 43 and 52, 53, respectively.

As the tapes 20 and 30 pass around rolls 43 and 53, they enter the sensing means 40. The path of the tapes 20 and 30 through the sensing means 40 will be described in greater detail later herein. At the point where the tapes 20 and 30 emerge from the sensing means, rolls 44 and 54 are respectively positioned. As it will be seen, the tape paths are symmetrical about the sensing means 40. The tapes 20 and 30 pass over rolls 44 and 54 and over rolls 45 and 55 spaced therefrom. The continued paths of the tapes 20 and 30 takes them about rolls 46 and 56 carried by tension arms 47 and 57, about idler rolls 48 and 58, about rolls 49 and 59 also carried by the tension arms 47 and 57, about idler rolls 61 and 71, and onto the reels 23 and 33, respectively. The tension arms 47 and 57 are biased by springs 62 and 72, respectively.

The arrangement of the tension arms 28, 38 and 47, 57 provides for easy insertion of the tapes 20 and 30 into the machine 10. When threading the tapes 20 and 30 into the machine, the tension arms 28, 38 and 47, 57 are merely manually rotated one at a time away from their associated stops 63, 64 and 73, 74 to a position beyond the tape paths and then are allowed to swing against the respective tapes.

The paying out of the tapes 20 and 30 from the reels 21 and 31 and the taking up of the records upon the reels 23 and 33 may be accomplished by any of the well-known servomechanisms already provided for these functions.

To facilitate the rewinding of a tape while another tape is being sensed by the sensing means 40, the reel containing the tape to be rewound is placed upon a stud element 66. The tape is then threaded onto an empty reel positioned to rotate about centers 22 or 32.

The tapes 20 and 30 are fed relative to the sensing means 40, FIG. 2, at a constant rate by means of a drive capstan 100 mounted on a shaft 101 journaled in a mounting plate 102 and extending therethrough to be driven at a constant speed in either a clockwise or counterclockwise direction by a motor M, FIG. 8. The center of the drive capstan 100, FIG. 2, is situated at the apex of a triangle formed by lines joining the centers of the drive capstan, the roll 44 and the roll 54. The mechanism for cooperating with the drive capstan 100 to feed the tape 20 relative to the sensing means 40 is identical to the cooperating mechanism for feeding the tape 30. In order to feed the tape 20, a friction drive roller 104 is rotatably mounted on a shaft 105 fixed between the lower end of spaced arms 106 and 107, FIG. 7, of an armature 108 of a magnet 109, shown in FIG. 2.

The armature 108 is pivotally mounted upon a pin 111 extending outwardly from a bracket 110 adjustably attached to a base casting bracket **110*a* rigidly fixed to the mounting plate 102. A U-shaped channeled member 112, FIG. 7, having a base 113 and outwardly extending sides 114 and 115 is fastened between or integral with the spaced arms 106 and 107 intermediate of the ends thereof. The depth of the channel in the member 112 is critical to the extent that, when the armature 108 is attracted to the magnet 109, there is adequate space for the record 20** to pass through the channel without interference, as shown in FIG. 5.

Before completing the description of the armature 108, greater details of the magnet 109 will be given. The structure of the magnet 109 is best shown in FIGS. 2 and 5. The magnet 109 has a spool-shaped core 116 having a central member 117 integral with end members 118 and 119. The end members 118 and 119 are of rectangular configuration and have flat surfaces 121, 122 and 123, 124, respectively. The flat surfaces 121 and 123 provide a seat for the sides 114 and 115 of the channeled member 112 when the magnet 109 is energized.

The central member 117 of the core 116 is embraced by coil windings 126 which wrap therearound to partially fill the area between the end members 118 and 119. Insulation elements 127 and 128 are situated between the coil windings 126 and the end members 118 and 119.

In order to provide a mounting means and a surface against which the tape may ride, a rectangular piece of nonmagnetic tubing 131 surrounds the coil windings 126 so that the outer surfaces of the tubing 131 which lie in the path of the tapes are flush with the end members 118 and 119 of the core 116. In fact, the tubing 131 and the end members 118 and 119 are ground flush to present a very flat surface for the tapes. In FIG. 5, a layer of insulation 132 is disposed between the coil windings 126 and the tubing 131. The insulation 132 may be of any suitable type, and good results have been achieved with resin potting compound.

In order to assemble the core 116 and coil windings 126 in the tubing 131, either of the end members 118 or 119 of the core 116 are inserted into the tubing 131 with the core 116 being turned 90° to enable the end members to enter the tubing 131. After the tubing 131 is around the central member 117, the core 116 is rotated 90° to bring the flat surfaces 121, 122, 123 and 124 into the tape paths whereby the end members 118 and 119 of the core 116 flank the sides of the tubing 131. Resin potting compound may then be introduced to fix the tubing 131 in position relative to the core 116 and also serve to perform the insulation function of elements 127, 128 and 132.

The tubing 131 is rigidly mounted, as by welding, to depend from the base casting bracket **110*a*, FIG. 2. It is necessary for effective operation to have the core 116, by means of the tubing 131, rigidly held in place because the armature exerts considerable force when it is attracted to the core 116 as the magnet 109** is energized.

An armature 136, similar to the armature 108, is also pivotally mounted to be attracted by the magnet 109. However, mechanism, which will be described later herein, is provided to selectively move either armature out of range of attraction of the magnet 109. The armature 136 is pivotally mounted upon a pin 137 extending outwardly from a bracket 138 adjustably attached to the base casting bracket **110*a*. The reason for having the pins 111 and 137 extending from the adjustable brackets rather than the base casting bracket 110*a* is to facilitate adjustment of the armatures 108 and 136** so that the friction drive roller 104, carried by the armature 108, and friction drive roller 139, carried by the armature 136, may be brought squarely into contact with the drive capstan 100 and thereby prevent feeding the tapes askew. Since the armatures 108 and 136 are identical in structure, like parts making up the armatures are given like reference characters. It should be understood that the capstan 100 rotates in a clockwise direction to feed the tape 20 in cooperation with the friction drive roller 104 and in a counterclockwise direction to feed the tape 30 in cooperation with the friction roller 139. The reversal of the direction of rotation of the capstan 100 will be described later herein.

The tapes 20 and 30 are brought to a stop within the space of one character by means of a magnet 150, FIG. 2. Armatures 151 and 152 are pivotally mounted to be attracted by the magnet 150. As the armatures 151 and 152 are attracted by the magnet 150, they pinch the tapes 20 and 30, respectively, against flat surfaces of nonmagnetic tubing 153 surrounding coil windings 154 of the magnet 150 in much the same manner in which the tubing 131 surrounds the coil windings 126 of the magnet 109. The tubing 153, in this instance, not only serves as a means for mounting the magnet 150 and for providing surfaces upon which the tapes may ride but it also provides anvils, or supporting surfaces, against which the tapes may be pressed to arrest the movement thereof. While the magnet 150 is substantially identical to the magnet 109, the armatures 151 and 152 are different from the armatures 108 and 136. The important difference between the armatures associated with the magnet 150 is that a channeled member 156, FIG. 4, bridging arms 157 and 158 of the armatures 151 and 152, in a manner similar to that of the channeled member 112, has sides 161 and 162 which are of such length to permit the base of the channeled member 156 to press against the tapes when the magnet 150 is energized. In fact, the armatures 151 and 152, FIG. 2, are normally biased by springs 163 and 164 so that the base of the channeled member 156 lightly presses upon the tapes as the same are being fed relative to the sensing means 40. The armatures 108 and 136 are biased by springs 142 and 143 away from the tapes so that the friction drive rollers 104 and 139 do not drag upon the tapes. Of course, the tapes ride clear of the base of channeled members 112 of the armatures 108 and 136.

The magnet 150 is mounted by means of the tubing 153 which is rigidly attached to a base casting bracket 165 which is rigidly attached to the mounting plate 102. The magnet 150 is mounted in line but spaced from the magnet 109. The armatures 151 and 152 are pivotally mounted upon pins 166 and 167 extending outwardly from brackets 168 and 169 adjustably attached to the base casting bracket 165.

While both armatures 151 and 152 may be attracted by the magnet 150, the armatures 151 and 152 are selectively movable out of the attracting range of the magnet 150. The mechanism utilized for selectively moving the armatures 108 and 136 out of the range of attraction of the magnet 109 is also utilized for selectively moving the armatures 151 and 152 out of the attracting range of magnet 150. The flux paths estabilshed upon energization of the magnets 109 and 150 are shown in FIGS. 5 and 4, respectively. It is seen in FIG. 2 that the armatures 136 and 152 have been moved out of the range of attraction of the magnets 109 and 150, respectively.

The machanism for selectively moving the armatures 108 and 151 out of the range of attraction of magnets 109 and 150, respectively, is substantially identical to the mechanism for moving the armatures 136 and 152 out of the range of attraction of magnets 109 and 150, respectively. The armatures are not only selectively moved out of the operating range of the magnets but are positioned remotely to enable easy insertion of the tapes.

The armatures associated with the tape which has just been sensed are automatically, upon completion of the sensing thereof, moved to a remote position. The armatures associated with a standby tape are automatically moved into the range of attraction of the magnets upon completion of the sensing operation of the running tape, and the standby tape is started by energizing the magnet 109 and de-energizing the magnet 150. Provision is made to suspend operation if the standby tape is not in fact in position for permitting the feeding thereof relative to the sensing mechanism.

Broadly, upon completion of sensing the running tape; for example, tape 30, FIG. 2, a signal is generated to energize a solenoid 170 for actuating linkages 180 to move the armatures 136 and 152 associated with the running tape 30 to a remote position from their related magnets 109 and 150, respectively.

With the solenoid 170 energized, the armatures 136 and 152 are not only positioned out of the range of attraction of the magnets 109 and 150, but they are sufficiently clear of the magnets to permit easy insertion of a new tape 30 which will then sand by so as to be ready to be fed when the tape 20 runs out. As the tape 20 runs out, the solenoid 170 is de-energized and a solenoid 190 is energized. The solenoid 190, when energized, actuates linkages 200 to move the armatures 108 and 151 to a remote position from the related magnets 109 and 150, respectively. De-energization of the solenoid 170 operates the linkages 180 to move the armatures 136 and 152 into the range of attraction of the magnets 109 and 150.

The linkages 180 are substantially identical to the linkages 200. It is seen in FIGS. 2 and 7 that the solenoid 190 has a downward extending core member 191 made up of a series of inverted T-shaped laminations 192 which are fixed between outer strap members 193 having their ends pinched together. The strap members 193 and laminations 192 are secured together by rivets 194 or other like fastening elements so as to move together as a unit. The pinched ends of the strap members 193 are attached to flanking links 195 and 196 at one of the ends thereof by means of a pin 197. The links 195 and 196 also flank and are attached to a horizontally disposed link 198 by a pin 199. The link 198 is rigidly attached to a pin 201 which extends laterally through a spacer or bushing 202, a link 203, and into the mounting plate 102. The pin 201 is journaled in the mounting plate 102, but the link 203 is rigidly attached to the pin 201. Hence, as the core member 191 of the solenoid 190 moves up or down, the pin 201 and the links 198 and 203 will be rotated; the direction of rotation depends upon which direction the core member 191 is moving.

The link 203 effectively acts to move the armatures 108 and 151. The lower end of the link 203 carries an outwardly projecting pin 204 which is in engagement with a curved portion of an S-shaped extension 205 of the armature arm 107. The upper end of the link 203 carries an outwardly projecting pin 206 which is engaged with the convergent end of a tapered or wedge-shaped extension 207 of the armature 151. By the linkage arrangement so far described, the armatures 108 and 151 are moved out of the range of attraction of the magnets 109 and 150 when the solenoid 190 is energized. Energization of the solenoid 190 causes the link 203 to pivot counterclockwise and, as the link 203 pivots counterclockwise, pins 204 and 206 cam the extensions 205 and 207 counterclockwise about the centers of the pins 111 and 166 and thereby carry the armatures 108 and 151 away from the magnets 109 and 150.

The link 203 also serves an additional function, which is to move a tape sensing lever 212 away from the tape 20. The pin 206 projecting from the upper end of the link 203 also journals a dog 208 having a tail member 209, a downwardly extending or depending leg 210, and an arm 211. The depending leg 210 carries an outwardly extending lip 213 for receiving one end of a spring 214 having its other end attached to a lever 216. The spring 214 normally urges the dog 208 so that the leg 210 engages a pin 217 spaced from the pin 206 and fixed to project outwardly from the upper end of the link 203. Hence, the dog 208 is normally maintained in a fixed position relative to the link 203. Further, the end of the arm 211 of the dog 208 is provided with a notch 218 for receiving a lip 219 projecting outwardly from the upper end of the lever 216. The lever 216 is rigidly attached to a shaft 221 which extends through and is journaled in the mounting plate 102. The reason that the shaft 221 extends through the mounting plate is that the shaft 221 carries a tape sensing lever contact C1, not shown in FIG. 2 but shown in FIG. 8, for indicating the presence and absence of a tape. Also, the shaft 221 extends through the lever 216 to terminate in a rectangular section 222 which facilitates the mounting of the tape sensing lever 212. It will be noted that the rectangular section 222 permits the tape sensing lever 212 to be mounted in different positions therealong so as to accommodate different width tapes because the tape sensing lever 212 has a laterally extending lip 223 which serves as an edge guide for the tape. The mechanism just described will be effective to move the tape sensing lever 212 to a remote position upon the solenoid 190 becoming energized. In this manner, a new tape may easily be inserted because the tape sensing lever 212, which is normally biased into the tape path by means of the spring 214, has been positioned remotely of the tape path by the solenoid 190. Of course, when a tape is positioned in the tape path, the tape sensing lever 212 rests upon the tape and the spring 214 is prevented from bringing the lip 219 of the lever 216 against the edge of the notch 218 formed in the arm 211 of the dog 208. However, when the tape runs out, the tape sensing lever 212 and the lever 216 pivot clockwise so that the lip 219 engages the edge of the notch 218 in the arm 211. Hence, as the solenoid 190 is energized to pivot the link 203 counterclockwise, the dog 208 through its arm 211 pivots the lever 216 counterclockwise and thereby pivots the tape sensing lever 212 counterclockwise to move it to a remote position out of the tape path. Although the solenoid 190 remains energized until tape 30 has been completely sensed, it is desirable to load a new tape 20 into position so that it will be ready for sensing prior to runout of tape 30. Further, the tape sensing lever 212 is to be positioned to sense the new tape 20 to indicate that there is in fact a new tape in position and ready for sensing. In order to accomplish this, the arm 211 of the dog 208 must be pivoted counterclockwise to permit the lip 219 of the lever 216 to clear the notch 218 in the arm 211. Hence, with the lip 219 clear of the notch 218, the lever 216 may pivot clockwise to bring the tape sensing lever 212 against the newly inserted tape 20.

The arm 211 is pivoted counterclockwise to permit the action just described to take place by means of a tape ready lever 226. The tape ready lever 226 is rigidly attached to a shaft 227 journaled in and extending through the mounting plate 102. The shaft 227 carries a tape ready contact C2, shown schematically in FIG. 8. The tape ready lever 226 is adapted to be detented in two different positions by means of a spring 228 which is fastened at one end to a pin 229 projecting from the lever 226 and to a pin 231 projecting from the mounting plate 102 through an elongated slot 232 in the lever 226. The ends of the slot 232 determine the two positions in which the tape ready lever 226 will be biased by the spring 228. If the center of the pin 229 lies above the center of the stationary pin 231, the lower end of the slot will be held against the pin 231; and, if the lever 226 is shifted so that the center of the pin 229 is moved below the center of the pin 231, then the upper end of the slot will be held against the pin 231 by the spring 228. The tape ready lever 226, essentially, has on one end a button 233 to facilitate manual depression of the lever, an intermediately positioned downward and outwardly projecting or offset arm 234 disposed to engage the lower end of the laminations 192 of the solenoid core 191, and at the other end an offset and upwardly projecting arm 236 adapted to engage the tail 209 of the dog 208 when the tape ready lever 226 is pushed downward or manually pivoted clockwise. It is thus seen that movement of the tape ready lever 226 is for the purpose of pivoting the dog 208 and for actuating contact C2, as will be discussed in more detail later herein. Of course, the tape ready lever 226 should be pushed downward only when the solenoid 190 is energized and when a new tape 20 has been inserted into position to be sensed. While the tape ready lever 226 is manually pushed downward to signal that a new tape has been inserted and is ready to be sensed, it is restored automatically by the solenoid core 191 which is urged downward by a spring 237 when the solenoid 190 of the solenoid core 191 becomes de-energized. The laminations 192 of the solenoid core 191 engage the offset arm 234 of the tape ready lever 226 to pivot it counterclockwise to the restore position.

The linkage 180 is identical to the linkage 200 which has just been described. The linkage 180 is operated by the solenoid 170 which has a core 241 comprising inverted T-shaped laminations 242 flanked by straps 243. The straps 243 are pinched together at one end which is connected to flanking links 244 by a pin 246. The links 244 are attached by a pin 247 to a horizontal link 248 rigidly attached to a shaft 249 which is journaled in the mounting plate 102. A link 251 is also rigidly secured to the shaft 249 but spaced from the link 248. The lower end of the link 251 has a pin 252 projecting outwardly therefrom to engage an S-shaped extension 253 of the armature arm 107 of the armature 136. The upper end of the link 251 has a pin 254 projecting outwardly therefrom on which a dog 256 is pivotally mounted. The pin 254, in addition to providing a support for the dog 256, also acts to cam a tapered or wedge-shaped extension 257 of the armature 152. The extension 257 is held in engagement with the pin 254 by means of the spring 164.

The dog 256 similar to the dog 208 has a tail member 258, a depending leg 259, and an arm 261. The depending leg 259 carries an outwardly extending lip 260 for receiving one end of a spring 262 having its other end attached to a lever 263. The spring 262 normally urges the dog 256 so that the leg 259 engages a pin 264 spaced from the pin 254 and fixed to project outwardly from the upper end of the link 251.

The lever 263 is rigidly attached to a shaft 266 which is journaled in and extends through the mounting plate 102. The portion of the shaft 266 extending through the mounting plate is not shown in FIG. 2, but it carries a contact C3 shown in FIG. 8. The shaft 266 is provided with a rectangular section similar to that of shaft 221 for adjustably mounting a tape sensing lever 267. The tape sensing lever 267, like the tape sensing lever 212, also serves two functions. It serves to sense the presence or absence of tape 30 and has a laterally extending lip 268 for laterally guiding the tape 30. The tape sensing lever 267 is biased into the tape path by means of the spring 262 which tends to urge the lever 263 counterclockwise and thereby urge the lever 267 into the tape path. The upper end of the lever 263 has an outwardly projecting flange 269 for engaging a notch 271 provided in the extreme end of the dog arm 261. It is seen in FIG. 2 that the tape sensing lever 267 is held out of the tape path because the solenoid 170 is energized. When there isn't any interference such as by the tape being sensed, the spring 262 urges the flange 269 against the shoulder of the notch 271 in the dog arm 261. Hence, when the link 251 is pivoted clockwise as the solenoid 170 is energized, the dog arm 261 pivots the lever 263 clockwise, thereby pivoting the tape sensing lever 267 to the position shown. Further, the pin 254 of the link 251 cams the tapered armature extension 257 clockwise, thereby moving the armature 152 out of the range of attraction of the magnet 150, while the pin 252 on the link 251 acts upon the S-shaped extension 253 to move the armature 136 out of the range of attraction of the armature 109.

With the armatures 136 and 152 and the tape sensing lever 267 moved out of the tape path, a new tape 30 may be inserted into position. After the new tape 30 has been positioned, a tape ready lever 273, rigidly attached to a shaft 274 journaled in and extending through the mounting plate 102, is depressed. The portion of the shaft 274 which extends through the mounting plate 102 carries a contact C4, shown in FIG. 8, whose function will be described later herein. The tape ready lever 273 is held in its depressed position by means of a spring 276 attached on one end to a pin 277 projecting from the lever 273 and a pin 278 fixed to project from the mounting plate 102 and extend through a slot 279 in the lever 273. When the tape ready lever 273 is depressed manually by pushing a button 281 fixed to one end of the lever 273, a finger 282 projecting upwardly from the other end of lever 273 engages the tail 258 of the dog 256 to pivot it clockwise. At the dog 256 pivots clockwise, the shoulder of the notch 271 on the dog arm 261 is moved downward and out of the way of the flange 269 on the lever 263. This permits the spring 262 to urge the lever 263 counterclockwise and thereby rotate the shaft 266 counterclockwise to bring the tape sensing lever 267 against the newly inserted tape 30. The lever 263, not the dog 256, will pivot after the flange 269 clears the notch 271 because the dog leg 259 engages the pin 264.

The depressed lever 281 is restored to the position shown in FIG. 2 when the solenoid 170 becomes de-energized. The core 242 engages an offset arm 283 projecting outwardly from the tape ready lever 273 to pivot the same clockwise as the solenoid 170 de-energizes and is restored by the spring 284.

The foregoing describes the mechanism for selectively moving and arresting the tapes 20 and 30 relative to the sensing mechanism 40. The sensing mechanism 40, briefly described, consists of light sources 291 and 292 disposed adjacent to lenses 293 and 394, respectively. The lenses 293 and 294 direct light rays from the light sources 291 and 292 toward light choppers 296 and 297, respectively. In order to sense the perforations in the tapes 20 and 30 at the high speeds mentioned, it is necessary to mechanically chop the light source. The light choppers comprise cylindrical housings 298 having a plurality of spaced slots 299 formed therein, as shown in FIGS. 2 and 3. The light choppers 296 and 297 are otherwise quite conventional and are mounted to be rotated by driving means, not shown. The light rays chopped by the choppers 296 and 297 impinge upon mirrored surfaces 301 and 302 of a triangularly shaped member 303 fixed within and to the base of a housing 304.

The light rays, of course, cannot impinge upon the mirrored surfaces 301 and 302 if there aren't any perforations in the tapes 20 and 30. The perforations in the tapes 20 and 30 are entered in channels and in coded form to represent data. Since the perforations are in discrete channels of the tape, a series of corresponding light responsive elements 306 may be fixed in the upper portion of the housing 304 to become energized by light rays permitted by the perforations in the tape to enter the housing 304. The circuits leading from the light responsive elements 306 are not shown and will not be discussed because they do not concern the present invention. When the sensing of either tape 20 or 30 has been completed, either of the light sources 291 and 292 associated with the tapes 20 and 30 may be turned off and on as appropriate so as to enable the sensing of the standby tape. The sensing means 40, as just described, enables either tape 20 or 30 to be sensed with an economy of elements.

The circuitry for enabling selective sensing of the tapes 20 and 30 is shown in FIG. 8. The circuitry will be more clearly understood if it will be remembered that the magnets 109 and 150 will never be energized at the same time. Normally, the solenoids 170 and 190 will not be energized simultaneously. Further, the light sources 291 and 292 normally will not be on at the same time. The circuitry shown in FIG. 8 illustrates the condition of the various electrical and electronic devices prior to power being applied by closing the switch PS which connects to the +48 volt supply.

In order that the magnets 109 and 150 will not be simultaneously energized, a bistable latch L has one input connected to a terminal 311 and to a contact of a manually operated start key SK. The terminal 311 is connected to a computer or other like device for signaling the tape reader to start. However, the condition of the latch L at the initial time of starting is unknown; hence, it may be reset by the start key SK which also may function to effect the starting of the reader.

The latch L also has an input connected to a terminal 312 and to a contact of a stop key STK. The terminal 312 is connected to circuitry of the tape reader for transmitting an impulse upon the sensing of a stop perforation in the tape. The other contacts of the start and stop keys ST and STK are connected to the switch PS. By means of the manual stop key STK, the tape, during a sensing operation, may be stopped as desired.

The latch L also has two outputs, one output being connected to an amplifier 313 and the other output being connected to an amplifier 314. The output of the amplifier 313 is connectable to the magnet 109 through parallelly connected normally closed contacts R1*a* and R2*a* of relays R1 and R2, respectively. The output of the amplifier 314 is connected to the magnet 150. The magnets 109 and 150 are both connected to the +150 volt supply. The relay R1 is connected between the +48 volt supply and ground potential through normally closed contacts C5 and C6 operated by the tension arms 28 and 47, respectively, and normally closed contacts C1 operated by the tape sensing lever 212. The normally closed contacts C1, C5 and C6 are opened when tape 20 is placed in position. Hence, when there isn't a tape 20 in the tape path, the relay R1 is energized. Once the relay R1 becomes energized, it may remain energized through its normally open contact R1*b* and a normally closed contact R3*a* of a relay R3. Therefore, so long as relay R3 does not become energized and if relay R1 becomes energized, it will remain energized even though tape 20 has been inserted in place to open contacts C1, C5 and C6.

Before discussing the electrical connections of relay R3, the connections of a relay R2 will be considered. The relay R2 is connected between the +48 volt supply and ground potential through normally closed contacts C3, C7 and C8 connected in series. The contact C3 is operated by the tape sensing lever 267, and the contacts C7 and C8 are operated by tension arms 38 and 57, respectively. The normally closed contacts C3, C7 and C8 are opened upon insertion of tape 30. Hence, prior to insertion of tape 30, the relay R2 becomes energized. The relay R2 may be maintained energized, even though the contacts C3, C7 and C8 may subsequently be opened upon insertion of tape 30, by means of its own normally open contacts R2*b* connected in series with normally closed contacts R4*a* of a relay R4. Of course, with any of the contacts C3, C7 and C8 open, the relay R2 will become de-energized when the relay R4 becomes energized. The relays R3 and R4 are effectively under control of the tape ready levers 226 and 273, respectively. The relay R3 is connected between the +48 volt supply and ground potential through the normally open contacts C2 operated by the tape ready lever 226, series connected with normally open contacts R2*c* of relay R2. The relay R4 is connected to ground potential and to the transfer contact of the normally open contacts C4 operated by the tape ready lever 273. The stationary contact C4 is connected to the stationary contact of normally open contacts R1*d* of relay R1. The transfer contact R1*d* is connected to the +48 volt supply. It is thus seen that the relays R3 and R4 may become energized only when the tape ready levers 226 and 273 are depressed to close the contacts C2 and C4 and the relays R2 and R1 are energized, respectively.

The solenoids 190 and 170 are connected between the +48 volt supply and ground potential through normally open contacts R1*c* of the relay R1 and normally open contacts R2*d* of the relay R2, respectively. Hence, the solenoids 190 and 170 become energized whenever the relays R1 and R2 become energized.

In order that only light source 291 will be on when sensing tape 20 and only light source 292 is on when sensing tape 30, the light sources 291 and 292 are connected between the +48 volt supply and ground potential through normally open contacts R2*e* of relay R2 and R1*e* of relay R1, respectively. Additionally, the coil windings of the motor M for driving the capstan 100 are connected through normally open and closed contacts R1*f* of the relay R1. With the relay R1 de-energized, the motor M is connected to drive capstan 100 in a clockwise direction. When the relay R1 is energized, the contacts R1*f* are transferred and the motor M is connected to rotate the capstan 100 counterclockwise.

From the foregoing, it may be generalized that relay R1 and, therefore, solenoid 190 will not be energized while tape 20 is being sensed. Further, under these conditions, the capstan 100 is rotating in a clockwise direction to feed the tape 20 downward. In addition, relay R2 will be energized while sensing tape 20 and, therefore, light source 291 will be on. Light source 292 will be off because relay R1 is de-energized. Of course, to feed tape 20, magnet 109 will be energized and magnet 150 will be de-energized. On the other hand, when sensing tape 30, the relay R2 will be de-energized and the relay R1 energized. Since relay R2 is de-energized, the solenoid 170 will be de-energized. Further, the light source 292 will be on and the light source 291 off. Again, the magnet 109 will be energized and the magnet 150 de-energized, and the capstan 100 will be rotating in a counterclockwise direction to drive the tape 30 downward relative to the sensing mechanism 40.

*Mode of Operation*

The operation of the tape reader will be described, assuming that there isn't a tape 20 or 30 inserted into position. Accordingly, the first step is for the machine operator to close the switch PS and thereby apply power to the control apparatus. After closing the switch PS, the relays R1 and R2 will become energized because the contacts C1, C5, C6 and contacts C3, C7 and C8 are closed because tapes 20 and 30 have not been placed in the reader at this time. With the relays R1 and R2 energized, the solenoids 190 and 170 will both be energized and light sources 291 and 292 will both be on. Further, the magnet 109 could not be energized since the contacts R1*a* and R2*a* are both open to interrupt the circuit.

Under the condition of having both solenoids 190 and 170 energized, the tape paths will be clear for easy insertion of either tape 20 or tape 30. Hence, either tape 20 or 30 may be inserted and the description will continue under the assumption that tape 20 is inserted first. After insertion of tape 20, the relay R1 will still be energized because, even though the contacts C5 and C6 are opened, the contact C1 still being closed, the relay R1 will remain energized through the now closed contact R1*b* and the normally closed contact R3*a*, the relay R3 being de-energized because the tape ready lever 226 has not been depressed to close the contacts C2. With the tape 20 in place, the tape ready lever 226 may be depressed to close the contacts C2 and thereby cause the relay R3 to become energized because the relay R2 is energized at this time, thereby having closed the contacts R2*c*.

When the relay R3 becomes energized, the relay R1 de-energizes because the contacts R3*a* open, thereby interrupting the hold circuit for the relay R1. With the relay R1 de-energized, the contacts R1*f* are transferred to the normal position and the motor M is rotating to drive the capstan 100 clockwise, which is the proper direction of rotation for effecting the downward feeding of the tape 20 relative to the sensing mechanism 40. Further, when the relay R1 became de-energized, the solenoid 190 became de-energized and thereby moved the armatures 108 and 151 into the range of attraction of the magnets 109 and 150, respectively. The solenoid 190, as it de-energizes, will also actuate the tape ready lever 226 to cause the opening of contacts C2. With the solenoid 190 de-energized, the spring 237 returns the core 191 to its downward position. The solenoid core 191, in moving downward, engages the outwardly projecting arm 234 of the tape ready lever 226 to move the same counterclockwise and thereby rotate the shaft 227 to effect the opening of the contacts C2. Opening of the contacts C2 causes the relay R3 to become de-energized. Although relay R3 becomes de-energized, the relay R1 will not become energized at this time because the contacts C1, C5, C6 and R1*b* are open. With the relay R1 still de-energized, the light source 292 will be off because the contacts R1*e* are open. Hence, the light source 292 will not interfere with the sensing of the tape 20.

Reviewing the conditions of the control means at this time, it is seen that the relay R1 is de-energized and the relay R2 is still energized. Consequently, the capstan 100 is rotating in a clockwise direction; the light source 291 is on and the light source 292 is off; the armatures 108 and 151 are in the range of attraction and the armatures 136 and 152 are out of the range of attraction of the magnets 109 and 150, respectively. The magnet 109 is capable of being energized, and the tape sensing lever 212 is against the tape 20 while the tape sensing lever 267 is out of the tape path. The tape 20 may now be fed relative to the sensing mechanism by depressing the start key SK to cause the latch L to have an output to the amplifier 313 and thereby effect the energization of the magnet 109 through the closed contact R1*a*. Of course, the magnet 109 will also become energized at this time if a start signal is applied to the terminal 311. With the start key SK depressed or with a start signal applied to the terminal 311, the latch L will be in a state whereby the magnet 109 is energized and the magnet 150 is de-energized. Upon energization of the magnet 109 and de-energization of magnet 150, the armature 108 is attracted to the pole piece surfaces 121 and 123 of the magnet 109 and the armature 151 is permitted to just drag on the tape 20 under the influence of the spring 163. With the armature 108 attracted by the magnet 109, the friction drive roller 104 is brought into contact with the tape 20 to urge it against the rotaing capsan 100 to effect downward feeding of the tape 20. The armature 108 is rapidly attracted to the magnet 109, upon energization thereof, because the armature members 114 and 115 connected by base member 113 straddle the tape 20 to lie in close proximity to the pole piece surfaces 121 and 123. Because the armature 108 is rapidly attracted to the magnet 109, the tape 20 starts to feed almost instantly and, after a brief period of acceleration, the tape is fed at approximately a constant rate relative to the sensing mechanism 40. The reels 21 and 23 for paying out and taking up the tape 20 are driven in the usual manner by the servomechanism to enable the capstan 100 to feed the tape at a constant speed. Of course, when the tape 20 is to stop feeding, the reels 21 and 23 are also stopped from rotating. The condition of the latch L may be switched upon the sensing mechanism 40 detecting a stop perforation or combination of perforations in the tape 20.

When the state of the latch L is switched, the magnets 109 and 150 simultaneously become de-energized and energized, respectively, to stop the feeding of the tape 20. When the magnet 109 becomes de-energized and the magnet 150 energized, the armature 108 is returned away from the magnet 109 by the spring 142 and the armature 151 is attracted to the magnet 150. As the armature 108 returns under the influence of the spring 142, the friction drive roller 104 is moved out of engagement with the tape 20. Hence, the tape 20 will not be held against the capstan 100 to be driven thereby. The armature 151, which had been dragging on the tape 20, will rapidly arrest the movement thereof, upon energization of the magnet 150, by pressing the tape 20 against the flat surface of the rectangular tubing 153 adjacent to the tape path. The members 161 and 162 connected by the base member 156 of the armature 151 also straddle the tape 20 so as to lie in close proximity to the pole piece surfaces. By this arrangement, the caliper of the tape is not a factor which could slow the response of the armature 151 when the magnet 150 is energized. Another start signal applied to the terminal 311 will cause the latch L to again change states and the magnets 109 and 150 will again simultaneously be energized and de-energized to start the feeding of the tape 20.

While the tape 20 is being sensed, the tape 30 may be inserted into position to be ready for sensing upon completion of the sensing of tape 20. Assuming now that tape 20 is being sensed and tape 30 has been positioned in the tape path, the tape path at this time is clear of the armatures 136 and 152 and the tape sensing lever 267. The relay R2 will still be energized, but the contacts C3, C7 and C8 will be open. With the tape 30 in position, the tape ready lever 273 may be depressed to bring the tape sensing lever 267 against the tape 30 and to close contacts C4 to enable the relay R4 to become energized when the relay R1 again becomes energized upon runout of tape 20. The solenoid 170 will still be energized at this time because relay R2 is still energized. The light source 292 is still off. The reader is now ready to sense the standby tape 30 when the tape 20 runs out.

When tape 20 runs out, the relay R1 becomes energized. Therefore, the solenoid 190 also becomes energized. Consequently, the armatures 108 and 151 and the tape sensing lever 212 are moved to a remote position out of the tape path. Relay R3 is still de-energized and, therefore, relay R1 remains energized through the hold circuit of the normally closed contact R3*a* and the now closed contact R1*b*. When relay R1 became energized as the tape 20 ran out, the contact R1*d* was closed to complete the circuit for energizing relay R4. With relay R4 energized, the circuit for holding the relay R2 energized is broken, or interrupted, and, consequently, relay R2 becomes de-energized. As the relay R2 de-energizes and the relay R1 becomes energized, the light source 291 for sensing tape 20 turns off and the light source 292 for sensing tape 30 turns on. This arrangement permits a single series of light responsive elements 306 to be utilized for sensing both tapes 20 and 30.

Additionally, when the relay R2 de-energizes, the solenoid 170 also de-energizes and the spring 284 returns the solenoid core 241, which in turn actuates the linkage 180 to bring the armatures 136 and 152 into the range of attraction of the magnets 109 and 150, respectively. Also, as the solenoid 170 de-energizes, the solenoid core 241, returned by the spring 284, engages the offset arm 283 on the tape ready lever 273, which is being held in the depressed position by the spring 276, to rotate the lever 273 clockwise and thereby restore the same and open the contacts C4.

The capstan 100 will be rotating in the proper direction, counterclockwise, to feed the tape 30 relative to the sensing mechanism 40 because the relay R1 is energized. Since at the time tape 20 ran out, a stop signal had not been received and the magnet 109 is still energized; hence, tape 30 will start feeding automatically. The feeding of the tape 30 relative to the sensing mechanism 40 will start as the armature 136 is attracted by the energized magnet 109 to bring or project the friction drive roller 139 against the tape 30 and thereby hold the same in driving engagement with the capstan 100. Since the armature 108 is out of the range of attraction of the energized magnet 109, the friction drive roller 104 will not be projected against the capstan 100 because the solenoid 190 is energized, and the tape path will remain clear for insertion of a new tape 20.

After a new tape 20 is inserted during the sensing of the tape 30, the tape ready lever 226 is depressed; however, the relay R3 does not become energized until the relay R2 is again energized, and this does not occur until tape 30 runs out. Hence, upon run out of tape 30, tape 20 will be ready for sensing and controls, as previously described, will be operated to permit the sensing of tape 20. The cycle of events continues in the manner described and the tape reader may operate continuously.

From the above, it is seen that the tapes may be sensed continuously. Further, it is seen that the tapes may be sensed at a relatively high character rate and that the apparatus for feeding the tape relative to the sensing mechanism may arrest the tapes upon receiving an end-of-record signal without moving a new record relative to the sensing mechanism so as to require storage for the sensed data which is not ready for processing. Also, it is seen that one tape may be sensed while another tape is threaded into a standby position. The tape may be placed into the standby position without any interferences from the mechanism for driving and arresting the tapes. It is also seen that, if desired, a tape may be rewound while another tape is being sensed. While the tape reader may operate continuously, a common sensing means is utilized for sensing tapes fed in different feed paths relative to the sensing mechanism.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for feeding records in web form having a record processing station, the combination comprising: a bidirectional rotatable drive capstan, means for selectively rotating said drive capstan in a predetermined direction, a pair of friction drive rollers mounted opposite each other in proximity to and in normally spaced relation with said drive capstan, actuating means selectively operable for projecting said friction drive rollers when in operating range of said actuating means into contact with said drive capstan, and means selectively operable to move said friction drive rollers out of operating range of said actuating means.

2. In a machine for processing records in web form fed in record paths along two sides of a record processing station, an anvil member fixedly mounted adjacent to each record path, a brake arm pivotally mounted in a normally spaced relation with each anvil member, actuating means selectively operable for projecting said brake arms when in operating range of said actuating means into contact with said anvil members, and means selectively operable to move said brake arms out of operating range of said actuating means.

3. In a machine for processing records in web form fed in record paths along two sides of a record processing station, a bidirectional rotatable drive capstan, means for selectively rotating said drive capstan in a predetermined direction, a pair of friction drive rollers mounted opposite each other in proximity to and in a normally spaced relation with said drive capstan, a first actuating means selectively operable for projecting said friction drive rollers when in operating range into contact with said drive capstan, an anvil member fixedly mounted adjacent to each record path, a brake arm pivotally mounted in a normally spaced relation with each anvil member, second actuating means selectively operable for projecting said brake arms when in operating range into contact with anvil members, first means selectively operable to move one of said drive rollers and brake arms out of operating range of said first and second actuating means respectively, and second means selectively operable to move the other drive roller and brake arm out of operating range of said first and second actuating means respectively.

4. In a machine for processing records in web form fed in record paths along two sides of a record processing station, an anvil member fixedly mounted adjacent to each record path; a magnet having spaced pole pieces mounted to flank said anvil members; a channeled armature pivotally mounted in a normally spaced relation with each anvil member and pole piece, the spacing between said armature and anvil member being greater than the spacing between the armature and pole piece; and means associated with each armature selectively operable to move the related armature out of the attracting range of said magnet.

5. In a machine for processing records in web form fed along a record path relative to a record processing station comprising: an anvil member fixedly mounted adjacent to the record path; a magnet having a pole piece laterally adjacent to said anvil member; and an armature pivotally mounted in a normally spaced relation with said anvil and said pole piece, the armature being shaped so that the spacing between the armature and the anvil is greater than the spacing between the armature and said pole piece.

6. In a machine for processing records in web form fed in record paths along two sides of a record processing station, a bidirectional rotatable drive capstan; means for selectively rotating said drive capstan in a predetermined direction; a first magnet spaced from and positioned in line with said drive capstan, said first magnet having spaced pole pieces disposed adjacent to said record paths; a pair of pivotally mounted armatures associated with said first magnet and having depending elements adapted to straddle said records, said armatures each carrying friction drive rollers adapted to cooperate with said capstan to feed the records upon said first magnet being energized; a second magnet spaced from said first magnet and positioned in line therewith, said second magnet having spaced pole pieces disposed adjacent to said record paths; anvil members disposed between said spaced pole pieces and adjacent to said record paths; a pair of pivotally mounted armatures associated with said second magnet and having depending elements disposed to straddle said records and a cross member connecting said depending elements to engage said records and press the same against said anvil members upon said second magnet being energized; a first set of linkages interconnecting one of the armatures associated with said first magnet with one of the armatures associated with said second magnet, said first set of linkages being selectively operable to move said one armature out of the range of attraction of said first and second magnets; a second set of linkages interconnecting the other armature associated with said first magnet with the other armature associated with said second magnet, said second set of linkages being selectively operable to move said other armature out of the range of attraction of said first and second magnets; and means for selectively energizing said first and second magnets to thereby selectively feed and arrest the records.

7. In a machine for processing records according to claim 6 including means operable upon runout of one of the records for actuating the linkages associated with the runout record to move the armatures interconnected thereby out of the range of attraction of said first and second magnets, and means operable upon runout of one of the records for actuating the linkages associated with the non-runout record to move the armatures interconnected thereby into the range of attraction of said first and second magnets.

References Cited in the file of this patent

UNITED STATES PATENTS

| | | |
|---|---|---|
| 2,686,637 | Dashiell et al. | Aug. 17, 1954 |
| 2,787,464 | Davidson et al. | Apr. 2, 1957 |
| 2,792,217 | Weidenhammer et al. | May 14, 1957 |
| 2,802,665 | Birchzer | Aug. 13, 1957 |
| 2,853,237 | Zaffarano et al. | Sept. 23, 1958 |
| 2,856,464 | Groom | Oct. 14, 1958 |
| 2,864,609 | Trimble | Dec. 16, 1958 |
| 2,865,631 | Tannenbaum | Dec. 23, 1958 |
| 2,913,192 | Mullin | Nov. 17, 1959 |
| 2,943,852 | Quirk | July 5, 1960 |
| 2,988,271 | John et al. | June 13, 1961 |
| 3,001,733 | Axon et al. | Sept. 26, 1961 |
| 3,002,671 | Brumbaugh et al. | Oct. 3, 1961 |

FOREIGN PATENTS

| | | |
|---|---|---|
| 786,046 | Great Britain | Nov. 13, 1957 |